US 6,318,634 B1

(12) United States Patent
Svetal et al.

(10) Patent No.: US 6,318,634 B1
(45) Date of Patent: Nov. 20, 2001

(54) SPEED VARIABLE ANGLE FACET WHEEL FOR SCANNER

(75) Inventors: Michael P. Svetal; Alexander M. McQueen, both of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/133,337

(22) Filed: Aug. 13, 1998

(51) Int. Cl.$^7$ ........................................ G06K 7/10
(52) U.S. Cl. ........................ 235/462.4; 235/472.01
(58) Field of Search ..................... 235/462.21, 462.22, 235/462.23, 462.39, 462.38, 462.01, 472.01, 494

(56) References Cited

U.S. PATENT DOCUMENTS

| | | | |
|---|---|---|---|
| 3,995,166 | * 11/1976 | Hobart et al. | 250/566 |
| 4,560,862 | * 12/1985 | Eastman et al. | 235/467 |
| 5,132,524 | * 7/1992 | Singh et al. | 235/467 |
| 5,177,343 | * 1/1993 | Takenaka | 235/436 |
| 5,179,271 | * 1/1993 | Lindacher et al. | 235/467 |
| 5,253,085 | 10/1993 | Maruo et al. | 358/481 |
| 5,286,961 | * 2/1994 | Saegusa | 235/467 |
| 5,298,729 | * 3/1994 | Wike, Jr. | 235/467 |
| 5,340,982 | * 8/1994 | Nakazawa | 250/235 |
| 5,343,029 | * 8/1994 | Katoh et al. | 235/467 |
| 5,365,049 | * 11/1994 | Peng | 250/235 |
| 5,469,291 | * 11/1995 | Plesko | 235/462.38 |
| 5,475,206 | * 12/1995 | Reddersen et al. | 235/462 |
| 5,475,207 | * 12/1995 | Bobba et al. | 235/467 |
| 5,498,862 | * 3/1996 | Edler | 235/457 |
| 5,555,125 | * 9/1996 | Peng | 359/203 |
| 5,559,320 | * 9/1996 | Loya | 235/467 |
| 5,629,510 | * 5/1997 | Quinn et al. | 235/462 |
| 5,646,766 | 7/1997 | Conemac | 359/204 |

FOREIGN PATENT DOCUMENTS

| | | |
|---|---|---|
| 63-066529 | 3/1988 | (JP) . |
| 51-50179 | 6/1993 | (JP) . |
| WO86/05940 | 10/1986 | (WO) . |

OTHER PUBLICATIONS

U.S. application No. 08/934,487, Colley et al., filed Sep. 19, 1997, "Dithering Assemblies for Barcode Scanners".*
French Search Report dated Jun. 5, 2000.

* cited by examiner

Primary Examiner—Thien M. Le
(74) Attorney, Agent, or Firm—Lyon & Lyon LLP

(57) ABSTRACT

A scan mechanism and method of scanning in which the sides of the scanning mirror have variable facet angles movable between at least two positions for providing multiple reflection angles for the mirror facet(s). In one configuration, the mirror facets of a rotating polygon are mounted and arranged such that the angular orientation of the mirror facets changes depending upon the rotational speed of the polygon.

32 Claims, 2 Drawing Sheets

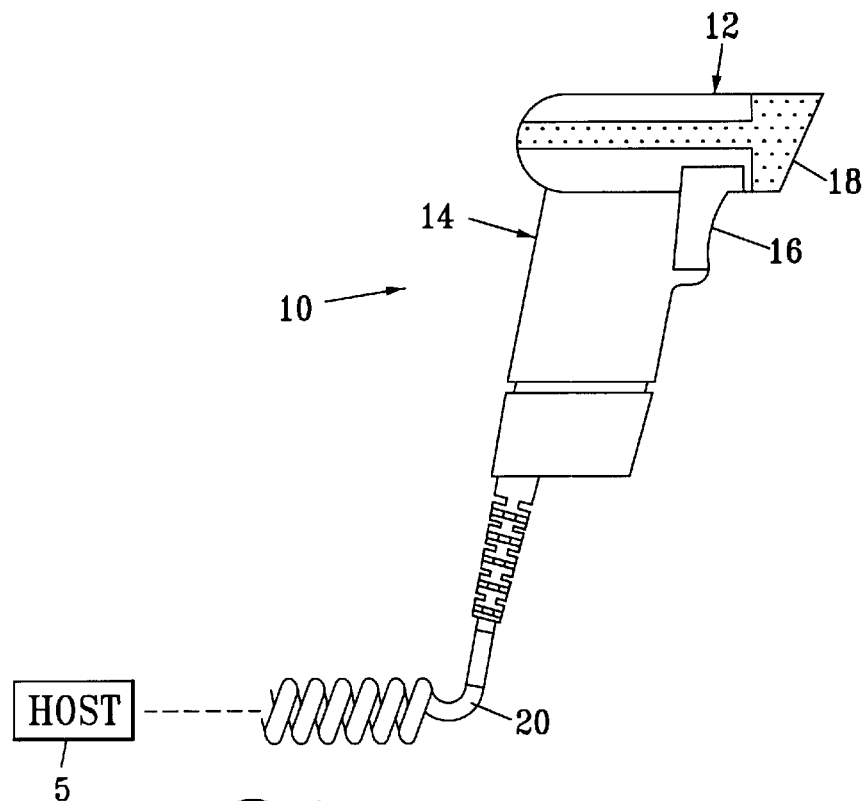
_fig.1_
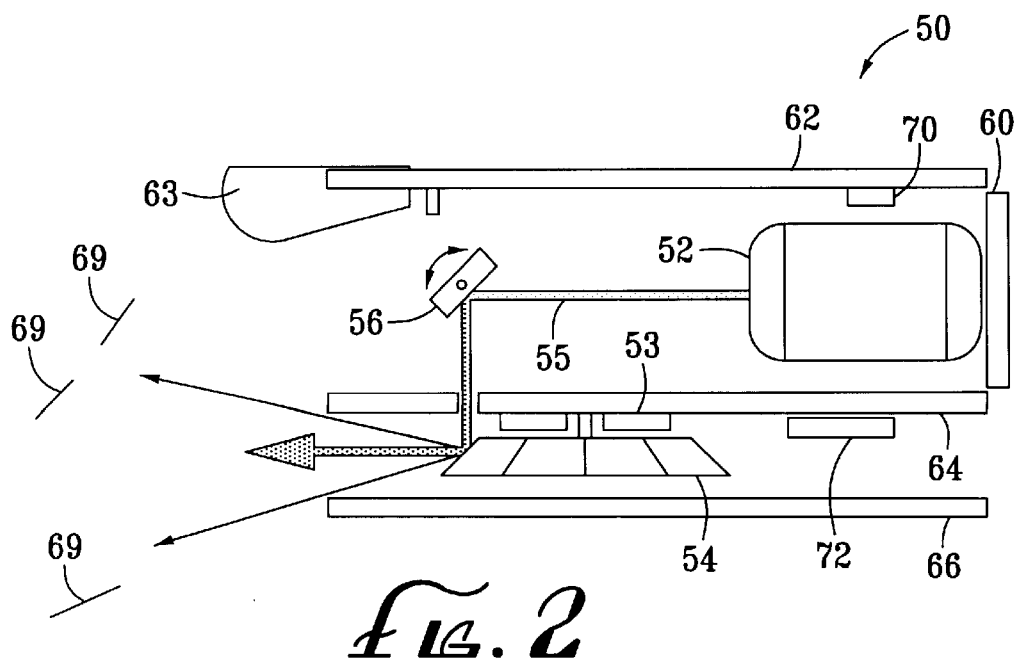
_fig.2_

SPEED VARIABLE ANGLE FACET WHEEL FOR SCANNER

BACKGROUND

The field of the present invention relates to optical systems for data reading and particularly to a rotating scanning system and method.

Typically a data reading device such as a bar code scanner illuminates a bar code and senses light reflected from the code to detect the bars and spaces of the code symbols and thereby derive the encoded data. In a common system, an optical beam of light, such as a laser beam produced by a laser diode is scanned over a scan angle so as to scan the laser spot across the item being read. A variety of mechanical scanning mechanisms are known as described in for example U.S. Pat. Nos. 5,475,206, 5,475,207 and 5,629,510 or U.S. application Ser. No. 08/934,487, each of these disclosures hereby incorporated by reference, such scanning mechanisms comprising a rotating polygon mirror, dithering or oscillating mirror, scanning light source or laser diode, rotating/oscillating prisms, holographic elements and others devices. These scanning structures generally have fixed mechanical characteristics for generating a specific scan pattern which cannot be changed during operation and would typically require changing of the optical components of the scanning mechanism in order to vary the scan patterns.

SUMMARY OF THE INVENTION

The present invention is directed to a scan assembly or scan mechanism and method of scanning in which the mirror facet(s) of the scanning mirror, in addition to the rotating or pivoting action, are movable between at least two positions for providing multiple paths for each of the mirror facet(s). In a preferred configuration, the mirror facets of a rotating polygon are mounted and arranged such that the angular orientation of the mirror facets changes in response to change in the rotational speed of the polygon.

BRIEF DESCRIPTION OF THE DRAWINGS

FIG. 1 is a side view of a handheld scanner as may be utilized by a preferred embodiment of the present invention;

FIG. 2 is a diagrammatic side view of an example scan module;

DETAILED DESCRIPTION OF PREFERRED EMBODIMENTS

Figure 3:
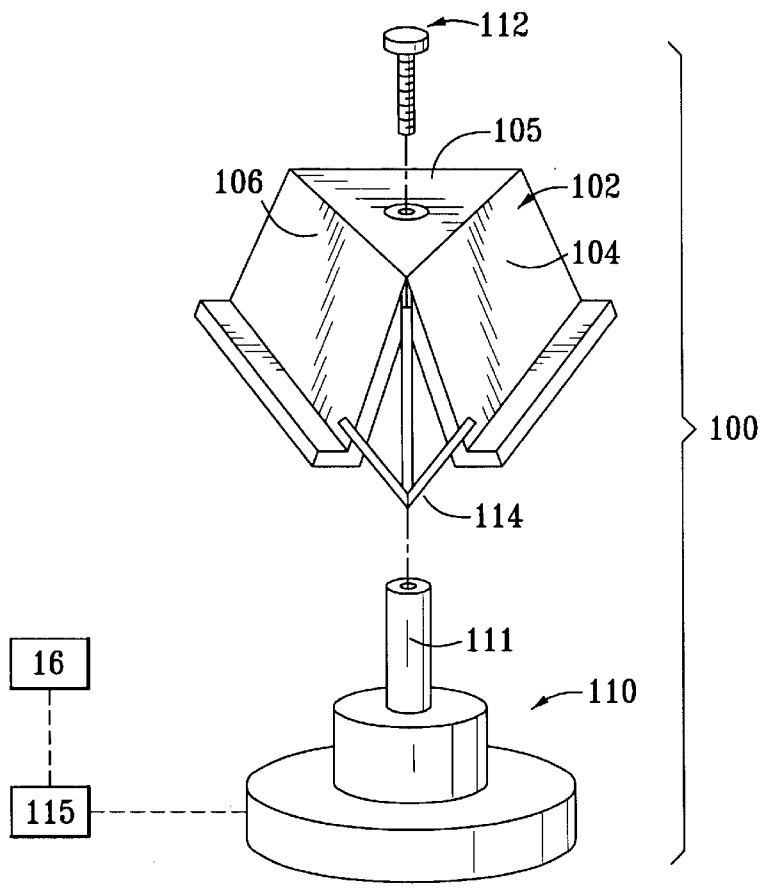
FIG. 3 is an exploded view of a facet wheel assembly according to a first preferred embodiment.

Preferred embodiments will now be described with reference to the drawings. For clarity of description, any element numeral in one figure will represent the same element if used in any other figure.

FIGS. 1–2 illustrate an example of a bar code reader 10 configured as a handheld gun-shaped device constructed of a lightweight plastic housing having a head portion 12 and pistol-grip type handle portion 14. The head portion 12 contains a removable scan module which contains a light source, a detector, the optics and signal processing circuitry. The scanner 10 may be attached to a host 5 via a cable 20, connected or incorporated into a portable data terminal, or may be cordless, powered by an internal battery, communicating with the host via wireless link or storing data in memory for periodic download, such as when integrated in a portable data terminal. A light-transmissive window 18 in the front end of the scan head portion 12 permits outgoing light beam 55 to exit and the incoming reflected light to enter. The user aims the reader 10 at a bar code symbol and actuates a trigger 16 on the handle portion 14 to activate the light source and scanning mechanism to scan the beam across the symbol.

Light reflected or scattered off the target is collected by a suitable collection system which may be non-retrodirectional as illustrated with a collection lens 63 and detector or may be incorporated in a retrodirectional system such as the systems disclosed in U.S. Pat. No. 4,475,207.

The scan assembly 50 may include one or more scan mechanisms, for example as shown in FIG. 2, a dithering mirror assembly 56 and a rotating polygon mirror assembly 54. Without the addition of the dithering mirror assembly 54 (or some other additional optical components such as pattern mirrors), the typical rotating polygon mirror scan mechanism will send out a single scan line or a series of generally parallel lines and thus cannot create a complex scan pattern.

FIG. 3 is an exploded view of a facet wheel assembly 100 according to a first preferred embodiment. The polygon mirror assembly 100 comprises a multi-faceted polygon mirror 102 mounted to a motor 110 via a suitable attachment mechanism such as screw 112 securing the polygon base 105 to the motor spindle or shaft 111. The polygon mirror 102 includes three mirror facets 104, 106 (the third mirror facet not being visible in the figure). Each of the mirror facets 104, 106 is attached only at one end thereof to the base 105 of the polygon mirror 102. The connection point of each facet 104, 106 to the base 105 is sufficiently flexible to allow the mirror facet 104, 106 to bow out or flex a desired amount when subjected to centrifugal force at various rotational speeds. Thus the angular orientation of the facet is changed depending upon the speed of rotation of the facet wheel 102 as controlled by a controller 115 communicating with the motor 110.

The amount of flexure or pivoting of the facets 122 may be controlled solely by rotational speed and flexure characteristics, or may be set by stops which set a maximum flexure. For example, a cage or stop 114 may be provided at the corners or all around the polygon 102 to stop the side facets 104, 106 at maximum flexure. The stops 114 may also provide added strength to the mirror facets 104, 106 to prevent over-flexing.

Figure 4:
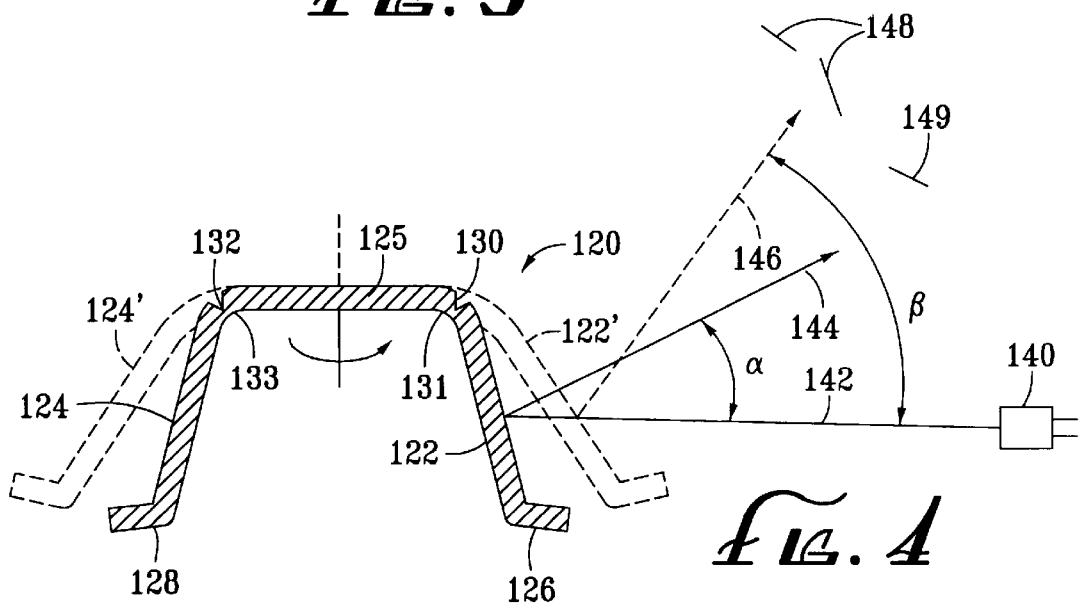
FIG. 4 is a diagrammatic cross-sectional view of an adjustable polygon wheel according to a second embodiment.

FIG. 4 illustrates another polygon mirror 120 in cross section. This polygon has four mirror facets, the figure only showing two of the facets 122, 124. Each facet 122, 124 has a central mirror section and a foot portion 126, 128. The foot portions 126, 128 provide additional mass at the outer perimeter to assist in the flaring out of the facet during rotation.

FIG. 4 illustrates the facet 122 in two positions. At a first rotational speed, for example 1000 rpm, the facet 122 takes the first position (which may be the same position as the at rest position) shown by the solid line. A reading beam 142 produced by light source 140 reflects off the facet 122 at an angle $\alpha$ along an outgoing path 144. As the motor is driven to a higher speed, for example 2000 rpm, the side facet 122 flexes outward to the second position shown by the dashed line. At the second facet position, the reading beam 142 reflects off the facet 122 at an angle $\beta$ along an outgoing path 146, thus enabling the single facet to produce at least two different scan lines in response to the rotational speed of the wheel 120.

The facets 122, 24 are connected to the base portion 125 at the top ends thereof and arranged with a slight outward flare when at rest such that gravity tends to maintain the side facets in the first position. Alternately, the at rest position of the side facets 122, 124 may be created solely by the mechanical flexure of the material or by the addition suitable spring material. The side facets 122, 124 are connected to the base 125 at connections 131, 133. The base 125, connection points 131, 133 and side facets 122, 124 may be constructed from separate pieces (i.e. non-integrated), integrally formed in a single molded construction, or formed by some other suitable one-piece construction. Suitable materials for the mirror facets and base include metal, metal alloys and certain plastics and combinations thereof.

The flare amount may be continuous, changing continuously based upon rotational speed, or may be incremental. In one embodiment, the connection points 131, 132 may be disposed proximate to notches 130, 132 in the side wall of the facets to provide the desired flexibility. The slots 130, 132 may be dimensioned such that at a given speed, the facet 122 flares outward to the position as showed by the dashed line closing off the gap within the slot 130 thereby inhibiting further outward flexure of the side facet 122.

The multiple position side facets 122, 124 may also provide for multifunctional scanner operation such as in the scanner disclosed in U.S. application Ser. No. 08/934,487 incorporated by reference. The scanner may operate in a first mode of operation whereby the polygon is rotated at a first rotational speed to produce a first scan pattern (such as a single scan line directly into the scan volume or alternately off a first set of pattern mirror or mirrors 149 and into the scan volume). This system enables both the scan pattern and the scan rate to be selected by operation of motor speed control. A second mode of operation may be produced by rotating the polygon at a second (higher) speed to flex the side facet 122 outward to the second position (shown by the dashed line) thereby reflecting the reading beam 142 along a second path, for example toward pattern mirror (or mirrors) 148 to produce a second scan pattern through the same window or through a different window toward a scan volume. In addition, the second pattern and second scan rate may be optimized for the second mode of operation.

Alternately, the facet mirrors may move between two or more positions by other mechanisms beside flexure. In one alternative embodiment, the facet mirrors may be mounted in tracks and slide radially outward along the tracks in response to the rotational speed of the wheel. In another alternative embodiment, the connection points 131, 133 may provide pivoting or movement of the facets 122, 124 via a hinged connection.

Thus the system may multiple sets of scan beams dependent upon or in response to different motor speeds. An exemplary method comprising;

providing a polygon mirror 120 with a plurality of mirror facets 122, 124;

rotating the polygon mirror 120 with a motor 110 at a first rotational speed with the mirror facets 122, 124 in a first position (the solid lines in FIG. 4);

generating an optical beam 142 with a suitable source such as a laser diode 140 and directing the optical beam 142 onto the polygon mirror 120;

scanning the optical beam 142 with the mirror facets 122, 124 in the first position to produce a first set of scanned beams 144;

rotating the polygon mirror 120, increasing it to second rotational speed;

moving the mirror facets 122, 124 to a second position (represented by the dashed lines in FIG. 4 of facets 122', 124') corresponding to the second rotational speed;

scanning the optical beam 142 with the mirror facets 122', 124' in the second position to produce a second set of scanned beams 146.

The speed of the polygon wheel 100 may be controlled via operation of a separate switch on the scanner or alternately by a two-position control in the trigger 16 or by multiple actuations of the trigger. For example, pulling the trigger 16 to a first position actuates the motor to a first speed and pulling the trigger to a second position actuates the motor to a second speed. Alternately, pulling the trigger a single time actuates the motor to a first speed and quickly pulling the trigger twice (double clicking) signals the controller 115 to operate the motor 110 at a second speed.

The polygon mirror may be integrally constructed in one piece by several methods. For example, the base and facet mirror substrate may be formed of molded optics such as acrylic, polystyrene or polycarbonate. Reflective surfaces are formed on the facets by applying reflective coating such as aluminum, silver or gold. Alternately, separate mirror facets may be secured to a plastic polygon base. is Another one-piece polygon may be made from metal such as aluminum, formed by stamping or machining. The reflective surfaces of the mirror facets may be formed by coating, polishing or diamond turning the metal.

Alternately separate mirror facets may be secured to the metal polygon base. Thus the facets and base may be integrally formed or alternately by any suitable combination of different components.

Though the scanner 10 of FIG. 1 is illustrated as a handheld scanner, the variable angle mirror facet embodiments described are readily applicable to fixed scanner applications such as in U.S. Pat. No. 5,475,207 or combination fixed/handheld applications such as in U.S. application Ser. No. 08/792,829.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A method of scanning comprising the steps of providing a polygon mirror with a base and a plurality of mirror facets;

rotating the polygon mirror at a first rotational speed with the mirror facets in a first position relative to the base;

generating an optical beam and directing the optical beam onto the polygon mirror;

scanning the optical beam with the mirror facets in the first position to produce a first set of scanned beams;

rotating the polygon mirror at a second rotational speed;

moving the mirror facets to a second position relative to the base corresponding to the second rotational speed;

providing stops for preventing flexure of the mirror facets beyond the second position;

scanning the optical beam with the mirror facets in the second position to produce a second set of scanned beams.

2. A method according to claim 1 further comprising mounting each of the mirror facets at one end thereof to the base such that angular orientation of the mirror facet changes via centrifugal force depending upon rotational speed of the polygon mirror thereby moving the mirror facets to the second position.

3. A method according to claim 2 further comprising mounting the mirror facets to the base via a hinged connection.

4. A method according to claim 2 further comprising mounting the mirror facet to the base via a flexible connection between the mirror facet and the base.

5. A method according to claim 4 further comprising preventing flexure of the mirror facets beyond the second position.

6. A method according to claim 4 further comprising providing stops for preventing flexure of the mirror facets beyond the second position.

7. A method of scanning comprising the steps of scanning comprising the steps of
providing a polygon mirror with a base and a plurality of mirror facets;
rotating the polygon mirror at a first rotational speed with the mirror facets in a first position relative to the base;
generating an optical beam and directing the optical beam onto the polygon mirror;
scanning the optical beam with the mirror facets in the first position to produce a first set of scanned beams;
rotating the polygon mirror at a second rotational speed;
moving the mirror facets to a second position relative to the base corresponding to the second rotational speed;
scanning the optical beam with the mirror facets in the second position to produce a second set of scanned beams;
flexibly connecting each of the mirror facets at one end thereof to a base of the polygon mirror;
changing angular orientation of the mirror facets via centrifugal force depending upon rotational speed of the polygon mirror,
wherein the base and the mirror facets are integrally constructed in one piece with a flexible connection therebetween comprised of a reduced wall thickness at the connection.

8. A method according to claim 7 wherein the base and the mirror facets are integrally constructed in one piece with a flexible connection therebetween comprised of a reduced wall thickness at the connection.

9. A method according to claim 1 wherein the step of moving the mirror facets to a second position further comprises
mounting the mirror facet to a base of the polygon mirror such that position of the mirror facet to the base changes via centrifugal force depending upon rotational speed of the polygon mirror.

10. A method according to claim 1 wherein the step of moving the mirror facets to a second position comprises
incrementally controlling rotational speed of the polygon mirror to shift the mirror facets between the first position and the second position.

11. A method of scanning comprising the steps of
providing a polygon mirror with a base and a plurality of mirror facets;
rotating the polygon mirror at a first rotational speed with the mirror facets in a first position relative to the base;
generating an optical beam and directing the optical beam onto the polygon mirror;
scanning the optical beam with the mirror facets in the first position to produce a first set of scanned beams;
rotating the polygon mirror at a second rotational speed;
moving the mirror facets to a second position relative to the base corresponding to the second rotational speed;
scanning the optical beam with the mirror facets in the second position to produce a second set of scanned beams;
wherein the step of moving the mirror facets to a second position comprises
translating the mirror facets radially outward along a track in response to centrifugal force dependidng upon the rotational speed of the polygon mirror.

12. A scanning system comprising a rotating polygon mirror assembly having a support and a plurality of mirror facets, wherein at least one mirror facet being movably attached to the support between a first position and a second position depending upon rotational speed of the polygon mirror assembly, wherein the mirror facets and the support are formed in a one-piece integral construction.

13. A scanning system comprising a rotating polygon mirror assembly having a support and a plurality of mirror facets, wherein at least one mirror facet being movably attached to the support between a first position and a second position depending upon rotational speed of the polygon mirror assembly.

14. A scanning system comprising a rotating polygon mirror assembly having a base and a plurality of mirror facets attached at one end thereof to the base, the mirror facets being movable relative to the base in respond to rotational speed of the polygon mirror assembly, wherein the base and the mirror facets are integrally constructed in one piece with a flexible connection therebetween comprised of a reduced wall thickness at the connection.

15. A scanning system according to claim 13 wherein the mirror facets and the support are formed in a one-piece integral construction.

16. A scanning system comprising a rotating polygon mirror assembly having a base and a plurality of mirror facets disposed about an outer periphery of the base, wherein each mirror facet having a fixed end attached to the base and a free end distal to the base, the mirror facet being disposed at a first angle to the base when the polygon mirror assembly is rotated at a first rotational speed and flaring radially outward to a second angle to the base when the polygon mirror is rotated to a second higher rotational speed, wherein the base and the mirror facets are formed in a one-piece integral construction.

17. A scanning system according to claim 16 further comprising
a motor operably connected to the rotating polygon mirror assembly for rotating the polygon mirror assembly;
a controller operably connected to the motor for controlling speed of the motor between at least a first rotational speed and a second rotational speed;
a light source directing a reading beam onto the mirror facets;
wherein the mirror facets move to a first position relative to the base when the polygon mirror is rotated at the first rotational speed and wherein the mirror facets move to a second position relative to the base when the polygon mirror is rotated at the second rotational speed.

18. A scanning system according to claim 16 wherein the base and the mirror facets are integrally constructed in one piece with a flexible connection therebetween comprised of a reduced wall thickness at the connection.

19. A scanning system comprising a rotating polygon mirror assembly having a base and a plurality of mirror facets disposed about an outer periphery of the base, wherein each mirror facet having a fixed end attached to the base and a free end distal to the base, the mirror facet being disposed at a first angle to the base when the polygon mirror assembly is rotated at a first rotational speed and flaring radially outward to a second angle to the base when the polygon mirror is rotated at a second higher rotational speed.

20. A scanning system according to claim 19 further comprising
- a motor operably connected to the rotating polygon mirror assembly for rotating the polygon mirror assembly;
- a controller operably connected to the motor for controlling speed of the motor between at least the first rotational speed and the second rotational speed;
- a light source directing a reading beam onto the mirror facets, wherein a first set of scanning beams is produced by scanning the reading beam off the mirror facets when the motor is rotated at the first rotational speed with the mirror facets disposed at the first angle and wherein a second set of scanning beams is produced by scanning the reading beam off the mirror facets when the polygon mirror assembly is rotated at the second rotational speed with the mirror facets disposed at the second angle.

21. A scanning system according to claim 19 wherein each of the mirror facets is attached to the base via a flexible connection.

22. A scanning system according to claim 19 wherein each of the mirror facets is attached to the base via a hinged connection.

23. A scanning system comprising
- a rotating polygon mirror assembly having a support and a plurality of mirror facets, wherein at least one mirror facet being movably attached to the support between a first possition and a second position depending upon rotational speed of the polygon mirror assembly;
- a handholdable housing having a switch, wherein actuation of the switch being operable to change rotational speed of the polygon mirror assembly from a first speed which is operative for positioning the at least one mirror facet to the first position and a second speed operative to position the mirror facet at the second position.

24. A method according to claim 1 wherein rotational speed speed of the polygonal mirror is continuously adjustable between the first rotational speed and the second rotational speed.

25. A scanning system comprising:
- a rotating polygon mirror assembly having a support and a plurality of mirror facets, wherein at least one mirror facet being movably attached to the support between a first position and a second position depending upon rotation speed of the polygon mirror assembly;
- a handholdable housing wherein the system is operable to switch between a first scanning mode optimized for a fixed mode of operation and a second scanning mode optimized for a portable mode of operation,
- wherein rotational speed of the polygon mirror assembly is controlled to actuate between the fixed mode and the portable mode.

26. A method of scanning comprising the steps of providing a polygon mirror assembly with a plurality of mirror facets arranged around a periphery thereof;
- directing an optical beam onto the polygon mirror assembly;
- generating a scan pattern by rotating the polygon mirror assembly to scan the optical beam across consecutive mirror facets;
- changing the scan pattern between a first pattern comprising a single scan line and a second pattern comprising a plurality of intersecting scan lines by chaning rotational speed of the polygon mirror assembly.

27. A scanning system according to claim 13 further comprising a handholdable housing having a switch, wherein actuation of the switch being operable to change rotational speed of the polygon mirror assembly from a first speed which is operative for positioning the at least one mirror facet to the first position and a second speed operative to position the mirror facet at the second position.

28. A scanning system according to claim 27 wherein the switch comprises a manually actuable trigger.

29. A scanning system according to claim 13 further comprising:
- a handholdable housing wherein the system is operable to switch between a first scanning mode optimized for a fixed mode of operation and a second scanning mode optimized for a portable mode of operation,
- wherein rotational speed of the polygon mirror assembly is controlled to actuate between the fixed mode and the portable mode.

30. A scanning system comprising
- a rotating polygon mirror assembly having a plurality of mirror facets movably attached around a periphery thereof;
- a motor operably connected to the rotating polygon mirror assembly for rotating the polygon mirror assembly;
- a controller operably connected to the motor for controlling speed of the motor to adjust rotational speed of the polygon mirror assembly;
- wherein position of the mirror facets shifts relative to each other depending upon rotational speed of the polygon mirror assembly.

31. A scanning system according to claim 30 wherein the polygon mirror assembly comprises a support rotatably driven by the motor, the mirror facets being mounted on the support via a connection which permits the facets to move relative thereto via centrifugal force applied by rotation of the polygon mirror assembly.

32. A method of scanning comprising the steps of
- providing a polygon mirror assembly with a plurality of mirror facets arranged around a periphery thereof;
- directing an optical beam onto the polygon mirror assembly;
- generating a scan pattern by rotating the polygon mirror assembly to scan optical beam across consecutive mirror facets;
- changing the scan pattern by changing rotational speed of the polygon mirror assembly.

* * * * *